No. 751,953. PATENTED FEB. 9, 1904.
S. B. SHUSTER.
HARNESS TUG.
APPLICATION FILED NOV. 12, 1903.
NO MODEL.
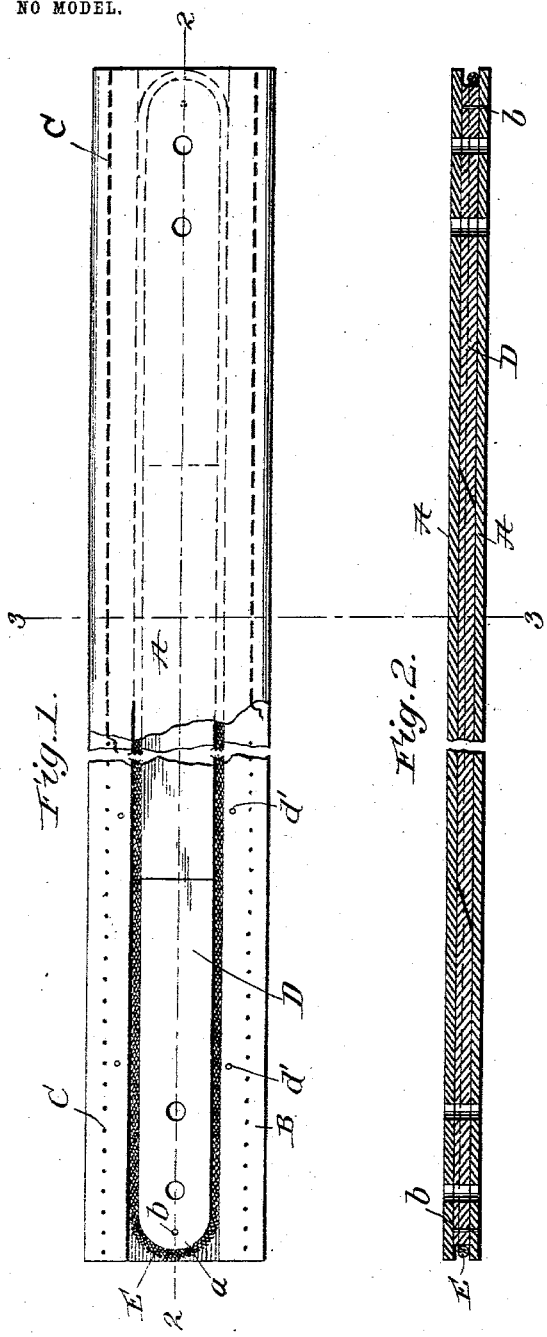
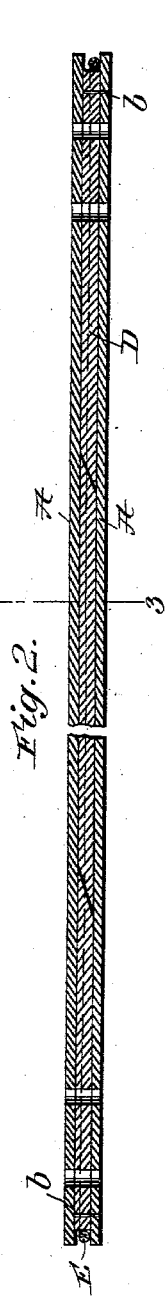
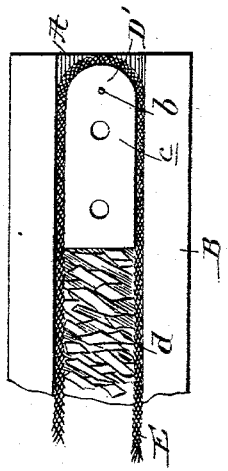
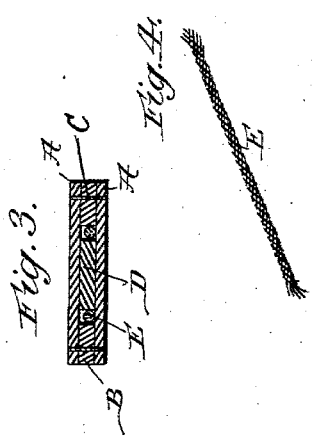
Witnesses
Inventor
Samuel B. Shuster.
By James J. Sheehy
Attorney No. 751,953. Patented February 9, 1904.

UNITED STATES PATENT OFFICE.

SAMUEL B. SHUSTER, OF NEW CONCORD, OHIO.

HARNESS-TUG.

SPECIFICATION forming part of Letters Patent No. 751,953, dated February 9, 1904.

Application filed November 12, 1903. Serial No. 180,863. (No model.)

*To all whom it may concern:*

Be it known that I, SAMUEL B. SHUSTER, a citizen of the United States, residing at New Concord, in the county of Muskingum and State of Ohio, have invented new and useful Improvements in Harness-Tugs, of which the following is a specification.

My invention pertains to tugs, more particularly tugs for use in heavy harness; and it has for its object to provide a tug which may be very cheaply produced and yet is equally as strong, if not stronger, than the ordinary tugs extant.

The invention will be fully understood from the following description and claims, when taken in connection with the accompanying drawings, forming part of this specification, in which—

Figure 1 is a broken view illustrating the tug constituting the preferred embodiment of my invention with one of the outer layers partly removed; Fig. 2, a broken longitudinal central section taken in the plane indicated by the line 2 2 of Fig. 1; Fig. 3, a transverse section taken in the plane indicated by the line 3 3 extending through Figs. 1 and 2; Fig. 4, a perspective view illustrating a portion of the wire loop embraced in the tug; and Fig. 5 a detail plan view of a modified construction as the same appears with one of the outer layers removed.

Similar letters of reference designate corresponding parts in Figs. 1 to 4 of the drawings.

In the preferred embodiment of my invention, which is shown in Figs. 1 to 4, the tug comprises outer layers A, of leather, edge layers B, also of leather, interposed between the edge portions of the outer layers and secured by through-and-through stitches C, a filler D, of leather or other material suitable to the purpose of the invention, interposed between the longitudinal central portions of the outer layers A and having by preference rounded ends $a$, secured by rivets $b$ or other suitable means to one of the outer layers, as illustrated, and a wire loop E, arranged around the filler D and also arranged between the outer layers, by means of which it is held in position. The filler D might be made of one continuous strip of leather without involving a departure from the scope of my invention. I prefer, however, to form said filler of a plurality of scraps of leather having beveled meeting ends, as best shown in Fig. 2, this in order to make use of scrap-pieces of leather which ordinarily go to waste and at the same time produce a sturdy and durable tug for heavy work. The wire loop disposed, as shown, with its bights around the ends of the filler D serves when the trace or tug is subjected to pull to place the pull on the ends of the filler, with the result that strain is removed from the outer layers A and the liability of the same being broken after a short period of use is obviated.

In the modified construction shown in Fig. 5 the filler D' is composed of end pieces $c$, secured by rivets $b$ or other suitable means between the outer layers A and scraps $d$, occupying the space between the inner ends of the end pieces and also between the longitudinal stretches of the wire loop E. The end pieces $c$, which are preferably of leather, form abutments for the bights of the wire loop, while the scraps $d$, which are also preferably of leather and quite small, as illustrated, serve to hold the longitudinal stretches of the wire loop against the inner edges of the edge layers B and also serve to hold the outer layers A apart.

In all of the embodiments of my invention rivets $d'$ may, when desired, be used in addition to the stitches C to connect the edge layers B to one of the outer layers A.

It will be appreciated from the foregoing that my novel tug may be very easily and cheaply produced, especially when the filler D is composed of scrap-pieces of leather arranged end to end, as shown in Figs. 1 and 2, or of small pieces of leather $c$ and scraps $d$, as shown in Fig. 5, also that the tug is exceedingly strong and is therefore calculated to withstand the usage to which tugs for heavy work are ordinarily subjected and last for an indefinite period.

I have entered into a detail description of the construction and relative arrangement of the parts embraced in the present embodiments of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

While I prefer to make the outer layers A, the edge layers B, and the filler D of leather, and the loop E of wire, I desire it understood that said portion may be made of other materials without departure from my invention.

Having described my invention, what I claim, and desire to secure by Letters Patent, is—

1. A tug comprising outer layers, edge layers interposed and secured between the outer layers, a filler extending throughout the length of the tug and having end portions secured between the end portions of said outer layers, and a loop secured between the outer layers, and having longitudinal stretches disposed between the adjoining longitudinal edges of the edge layers and the filler, and also having bights extending around the end portions of the filler.

2. A tug comprising outer layers, a filler having end portions secured between the end portions of the outer layers; said filler being formed of scraps of leather, and a loop secured between the outer layers, and having bights surrounding the end portions of the filler.

3. A tug comprising outer layers, a filler having end portions secured between the end portions of the outer layers; said filler being made up of portions, having beveled meeting ends, and a loop, secured between the outer layers and surrounding the filler and having bights extending around the ends of the filler.

4. A tug comprising outer layers, edge layers, interposed and secured between the outer layers, a filler having end portions secured between the end portions of the outer layers; said filler being made up of portions, having beveled meeting ends, and a loop, having longitudinal stretches disposed between the adjoining edges of the edge layers and the filler, and also having bights extending around the end portions of the filler.

In testimony whereof I have hereunto set my hand in presence of two subscribing witnesses.

SAMUEL B. SHUSTER.

Witnesses:
GEORGE H. ROLLER,
JOHN B. SMOCK.